INVENTORS
SIEGFRIED LENDLE
SCOTT R. BOND
BY
Charles F. Chisholm
ATTORNEY

March 21, 1961  S. LENDLE ET AL  2,975,932
BOX HAVING REMOVABLE AND REPLACEABLE COVER
Filed Nov. 18, 1959  5 Sheets-Sheet 2

*INVENTORS*
SIEGFRIED LENDLE
SCOTT R. BOND
BY Charles F. Chisholm
ATTORNEY

United States Patent Office 2,975,932
Patented Mar. 21, 1961

2,975,932

BOX HAVING REMOVABLE AND REPLACEABLE COVER

Siegfried Lendle, Astoria, N.Y., and Scott R. Bond, North Plainfield, N.J., assignors to Levolor Lorentzen, Inc., Hoboken, N.J., a corporation of New Jersey Filed Nov. 18, 1959, Ser. No. 853,745

15 Claims. (Cl. 220—55)

This invention relates to boxes having removable and replaceable covers. The invention is applicable to boxes used for shipping or housing electrical apparatus and will be disclosed and discussed in that connection.

A rugged box is desirable for housing sensitive electrical apparatus, particularly if the box is to be used as a shipping box. Where such electrical apparatus is used in the field it is often desirable to leave it in the box during use. Also it is often desirable to stack the boxes, both during shipment and during use of the apparatus. In situations where time is an important consideration, it is desirable that the box have a cover which may be quickly and conveniently removed and replaced without the use of tools. In addition, it is desirable that the cover close the box in watertight manner.

Among the objects of the invention are to provide a box having a cover that is removable and replaceable in an improved manner; to provide a box having such a cover which makes a watertight closure; to provide a box having such a cover which can be quickly removed and replaced without the use of tools; to provide for improved clamping of the cover to the body of the box; to provide a cover-securing means which may be so integrated into the box that it will not project beyond the outer surfaces of the box when the cover is in place; and to provide a box having a plurality of cover-securing latches which, when the cover is removed, are held against fortuitous movement into a position in which they would interfere with application of the cover to the body of the box.

Various other objects and advantages will be apparent from the detailed disclosure hereinafter of the best mode thus far contemplated by us of carrying out of invention. Unless otherwise indicated, the specification and drawings refer only to the particular mode disclosed of carrying out our invention; and it will be understood that the invention may be carried out in other modes.

In the claims, parts may at times be identified by specific names for clarity and convenience, but such nomenclature is to be understood as having the broadest meaning consistent with the context and the scope of our invention as distinguished from the prior art. Since the box may be placed in any position, no limitation is to be implied where reference to any particular oriented position is used in the specification, the drawings, or the claims. For clarity and convenience, the structure will ordinarily be referred to on the basis of the box standing upright with the cover at the top of the box.

In the drawings, forming part of this specification:

Figure 1:
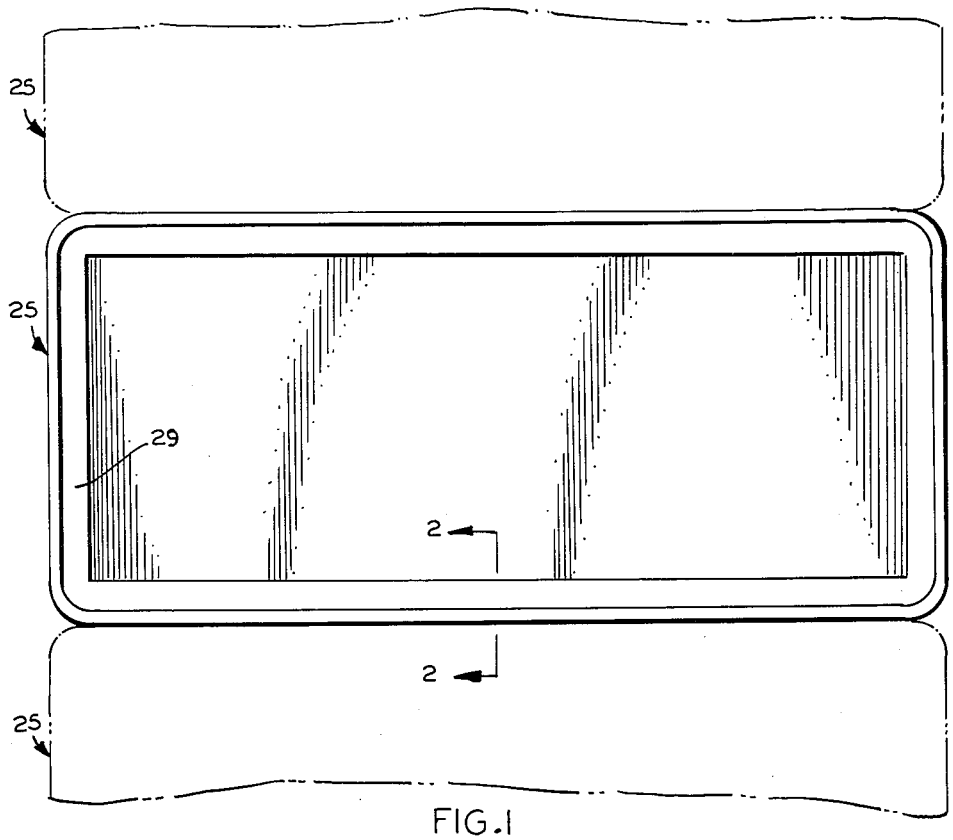
Fig. 1 is a diagrammatic front elevation indicating a plurality of the boxes stacked one above the other on their sides with the covers removed.
Figure 2:
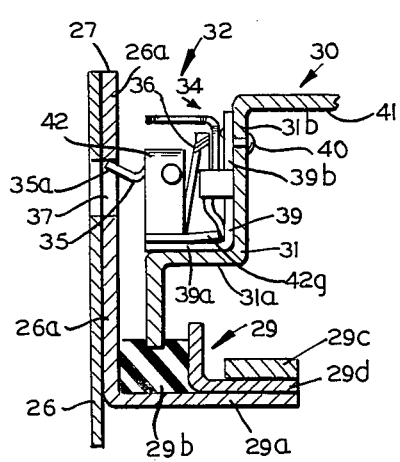
Fig. 2 is a detail section, taken at the location indicated by the line 2—2 in Fig. 1, showing the upper porton of the wall of the box, the adjacent portion of the cover, and one of the latches for clamping the cover in place.

Reference will first be had to Figs. 1 and 2. In Fig. 1 boxes 25 are indicated diagrammatically, stacked on their sides with the covers removed. This permits use of the housed apparatus without its being removed from the boxes. Fig. 2, which is a structural view, shows a fragment of one of the boxes, standing in upright position, with the cover in place.

The box 25, which is made of aluminum 1/16" thick, is rectangular and has an annular side wall 26 providing a mouth at 27. Extending downwardly from the mouth 27 the wall is reinforced by an aluminum plate 26a that is 1/8" thick. This plate extends completely around the box and is welded to the body of the side wall. Spaced from the mouth of the box is an annular abutment, designated as a whole by 29, which also extends entirely around the box and which has a base portion 29a. This base portion is 1/8" thick and is integral with the lower edge of the wall-reinforcing layer 26a. The abutment 29 is faced with a peripherally continuous rubber gasket 29b. The abutment also includes aluminum members 29c and 29d which extend entirely around the box, these members being welded together and to base portion 29a. The member 29d confines the gasket 29c and the two members 29c and 29d constitute part of the mount for the electrical apparatus that is placed within the box.

The cover, designated as a whole by 30, is pressed from sheet aluminum 1/16" thick. It has the same peripheral shape as the annular wall of the box but is smaller and nests within the wall of the box. The cover has a skirt designated as a whole by 31, the free edge of which contacts the gasket 29b of the abutment 29. This skirt has an offset 31a which affords an annular channel 32 extending around the inside of the box. The bottom of the channel 32 is formed by the offset 31a of the cover-skirt, while the outer wall of the channel is formed by the reinforced portion of the wall of the box and the inner wall of the channel is formed by vertical portion 31b of the skirt.

Distributed about the cover 30 is a series of like latches, one latch being shown in Fig. 2 and being designated as a whole by 34. For the boxes indicated in Fig. 1 we use eight latches for each box, three for each long side of the box and one for each short side of the box. The latch 34 includes a locking dog 35, actuated by a finger-operable locking lever 36, through which the latch acts to latch the cover 30 to the side wall of the box and clamp it against the gasket 29b of abutment 29. Opposite each locking dog the box-wall 26 is provided with dog-receiving means in the form of a rectangular opening 37 through the reinforced portion of box-wall 26. The opening 37 is somewhat wider than the locking dog and is .410" high with its top positioned .690" from the top edge of the box-wall. When the locking dog 35 is swung toward locked position, the nose 35a of the dog enters the opening 37 and bears against the top of the opening. In Fig. 2 the dog is shown in fully latched position, in which the nose 35a of the dog is upwardly inclined.

The latch 34 includes a frame 39, stamped in one piece from heavy-gage sheet steel. This frame is L-shaped, with horizontal and vertical legs 39a and 39b. The horizontal leg 39a rests on top of offset 31a of the skirt of the cover. The vertical leg 39b is against vertical portion 31b of the skirt and is firmly secured thereto by two rivets, one of which is shown at 40. When the latch is in latched position, the pressure set up between the top of dog-receiving opening 37 and the nose 35a of the locking dog is transmitted to the cover 30, thereby clamping the cover against the gasket 29b of abutment 29 and making a watertight seal.

Figure 3:
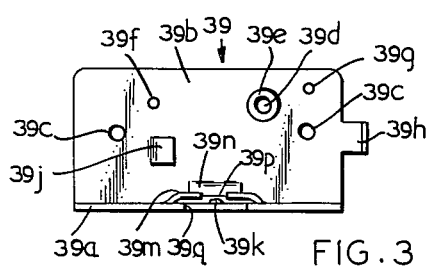
Fig. 3 is a front elevation of the frame of the latch.
Figure 4:
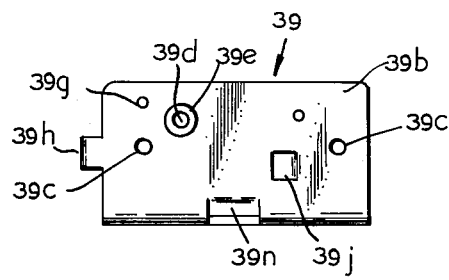
Fig. 4 is a rear elevation of the frame of the latch, looking from the rear of Fig. 3.
Figure 5:
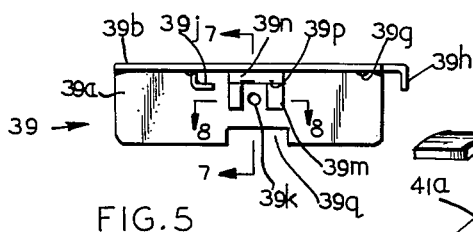
Fig. 5 is a top plan view of the frame of the latch, looking from the top of Fig. 3.

The frame 39 of the latch 34 is shown per se in Figs. 3–5. The vertical leg 39b is provided with holes 39c, 39c to receive rivets 40 (Fig. 2) for securing the latch to the cover 30. Leg 39b is also provided with a hole 39d to receive the pivot of locking lever 36. Around the hole 39d metal is pressed out to form an integral washer 39e, which is raised as the frame is viewed in Fig. 3 and which acts as a thrust bearing for the locking lever 36. The pressing out of the washer results in a corresponding annular depression on the back of frame leg 39b as is seen in Fig. 4.

Raised buttons 39f and 39g are also pressed out from the metal of leg 39b, leaving nonfunctional depressions on the back of leg 39b as are seen in Fig. 4. The locking lever 36 has a depression which makes snap engagement with button 39f when the locking lever is in locked position, and has another depression which makes snap engagement with button 39g when the locking lever is in unlocked position. A finger 39h extends into the path of the locking lever and arrests it in unlocked position.

Figure 7:
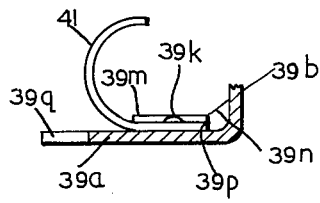
Fig. 7 is a fragmentary sectional view taken as indicated by line 7—7 in Fig. 5 showing the frame of the latch with the C-shaped spring of Fig. 6 attached thereto.
Figure 8:
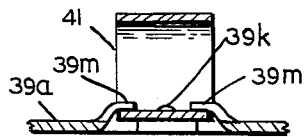
Fig. 8 is a fragmentary section taken as indicated by the line 8—8 in Fig. 5 showing a portion of the frame of the latch with the pring of Fig. 6 attached thereto.

An L-shaped finger 39j is struck forwardly from the frame leg 39b for a purpose to be explained. At its transverse center line, frame leg 39a is provided with an upwardly struck button 39k. Associated with this button are opposed fingers 39m, 39m, struck up from leg 39a; see also Fig. 8. At the juncture of frame legs 39a and 39b a strip of metal 39n is pressed forwardly from vertical frame leg 39b to provide an abutment 39p (see also Fig. 7) for a purpose which will appear. A notch 39q affords additional clearance for down-swing of the locking dog in instances where it may be desirable to have it.

Figure 6:
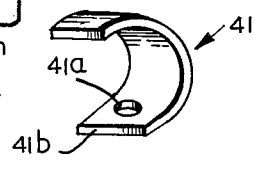
Fig. 6 is a perspective view of a C-shaped spring which, when incorporated in the latch, retracts the locking dog of the latch.

Fig. 6 shows a C-shaped spring 41 which we make of hardened beryllium copper. The metal of this spring is only .015" thick, and the thickness of the spring as seen in the drawings is necessarily exaggerated. Near its lower end this spring has a hole 41a. The spring is assembled with the latch frame 39 by inserting the lower end of the spring under the raised fingers 39m, 39m and forcing it rearwardly, the metal of the spring flexing and permitting the hole 41a to snap over the button 30k. As the spring is brought to this position, the tip 41b of the spring engages the abutment 39p which acts as a stop and also opposes swivel movement of the spring on button 39k. Swivel movement is further opposed by the contact of the side edges of the spring with the rising portions of fingers 39m, 39m.

Figure 9:
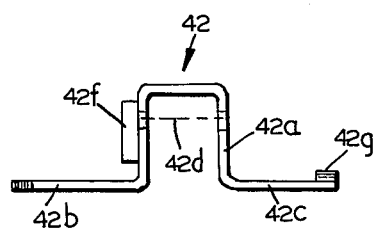
Fig. 9 is a front elevation of a stirrup which, when incorporated in the latch, is attached to the latch frame shown in Figs. 3–5.
Figure 10:
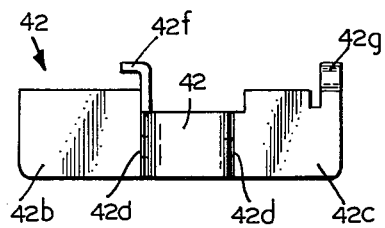
Fig. 10 is a top plan view of the stirrup shown in Fig. 9, looking from the top in Fig. 9.
Figure 11:
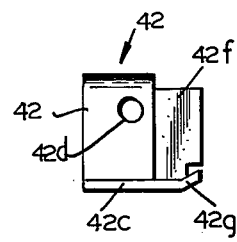
Fig. 11 is an end elevation of the stirrup shown in Figs. 9 and 10, looking from the right of Fig. 10.

Figs. 9–11 show per se the stirrup in which the locking dog is mounted. The stirrup, designated as a whole by 42, is a one-piece stamping of heavy sheet steel having a vertical loop 42a extending upwardly from base portions 42b and 42c. The two vertical legs of loop 42a are pierced at 42d, 42d to receive the pivot of the locking dog. A hooklike member 42f extends rearwardly from the left leg of the loop 42, and an inclined tab 42g extends rearwardly from the right-hand end of base portion 42c. These two members contact vertical frame leg 39b and locate the stirrup for welding of base portions 42b and 42c to frame leg 39a. Also, the frame and stirrup are assembled with the end of hook member 42f behind outstruck finger 39j (see Figs. 21–23). Thus, the stirrup 42 (including an upper portion thereof) is structurally tied to the frame leg 39b. This provides support for the counterclockwise forces (see Fig. 2) that are imposed upon the stirrup 42 through the pressure exerted between the top of the dog-receiving hole 37 and the nose 35a of the locking dog.

Figure 14:
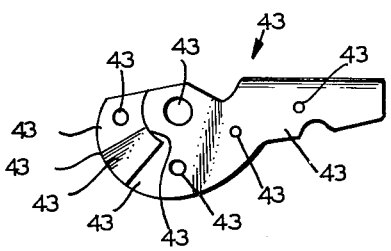
Fig. 14 is a rear elevation of the body of the locking lever, looking from the back of Fig. 12.

In Fig. 2 the locking lever is designated as a whole by 36. This lever is composed of a body 43 shown in Figs. 12–14 and an arcuate spring 44 shown in Fig. 15. The body 43 is a one-piece stamping of heavy sheet steel having a hole 43a to receive a pivot pin. Extending radially from the hole 43a is an operating arm 43b provided with a finger tab 43c. A reinforcing flange 43d extends along the edge of the arm 43b.

Hole 43a is at the center of a sector-shaped portion 43f. The sector-shaped portion is arcuately severed at 43g to provide an arcuate web 43e, one end of which is attached to the body of the sector-shaped portion and the other end of which is free. This web is so stamped as to provide an inclined portion 43h and a parallel portion 43i. These two portions are better seen in Fig. 18.

Figure 12:
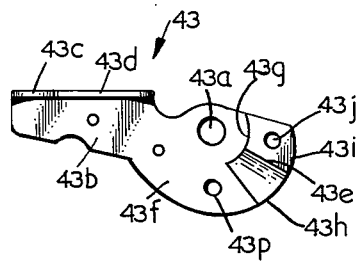
Fig. 12 is a front elevation of the body of a locking lever that is incorporated in the latch.
Figure 13:
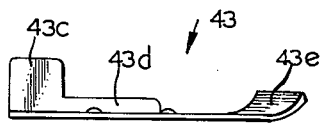
Fig. 13 is a view of the body of a locking lever, looking from the bottom of Fig. 12.

On the back of the lever body 43 a small depression 43k (Fig. 14) is provided to make snap engagement with button 39f in Fig. 3. Also, a small depression 43m is provided to make snap engagement with button 39g in Fig. 3. Formation of these depressions 43k and 43m results in nonfunctional buttons on the opposite face of the lever body as are seen in Figs. 12 and 13. Holes 43j and 43p are provided for the mounting of the arcuate spring 44 shown in Fig. 15.

Figure 15:
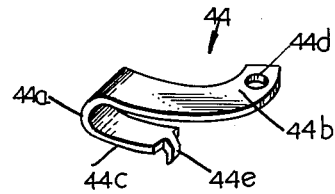
Fig. 15 is a perspective view of an arcuate spring which, when attached to the body of the locking lever shown in Figs. 12–14, becomes a part of the locking lever.

Spring 44 in Fig. 15 is formed of an arcuate strip of heavy-gage hardened beryllium copper, folded back upon itself at 44a to provide two spaced arcuate branches 44b and 44c which are capable of yielding relative to one another. At the end of branch 44b there is a hole 44d and at the end of branch 44c there is a downwardly projecting finger 44e.

Figure 16:
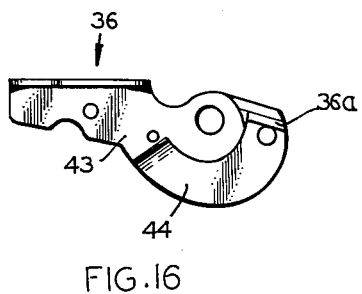
Fig. 16 is a front elevation of the locking lever including the spring shown in Fig. 15.
Figure 17:
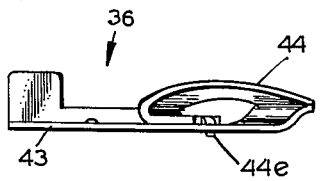
Fig. 17 is a view of the locking lever, looking from the bottom of Fig. 16.
Figure 18:
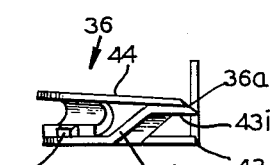
Fig. 18 is a view of the locking lever, looking from the right of Fig. 16.

The complete locking lever 36 is shown in Figs. 16–18, both ends of the arcuate spring 44 being anchored to the body 43 of the lever. This anchorage is by finger 44e being in hole 43p shown in Figs. 12 and 14 and by a flush rivet passing through both hole 44d shown in Fig. 15 and hole 43j shown in Figs. 12 and 14. After the arcuate spring 44 has been attached to the body 43 of the locking lever, the nose of the lever is bevelled at 36a by filing or grinding. This bevel extends across both the end of spring 44 and the end of arcuate web 43e.

Figure 19:
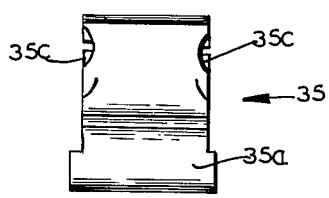
Fig. 19 is a front elevation of a locking dog that is incorporated in the latch.
Figure 20:
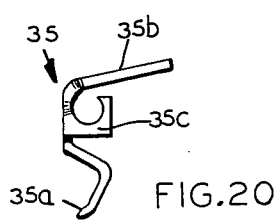
Fig. 20 is an edge view of the locking dog looking from the right of Fig. 19.

The locking dog 35 is shown per se in Figs. 19 and 20. This is a one-piece stamping of heavy-gage beryllium copper. It includes a nose 35a and a pressure-receiving arm 35b, the nose and arm being angularly related to each other as shown in Fig. 20. Pierced ears 35c, 35c are turned back and serve to receive a pivot pin for the dog.

Figure 21:
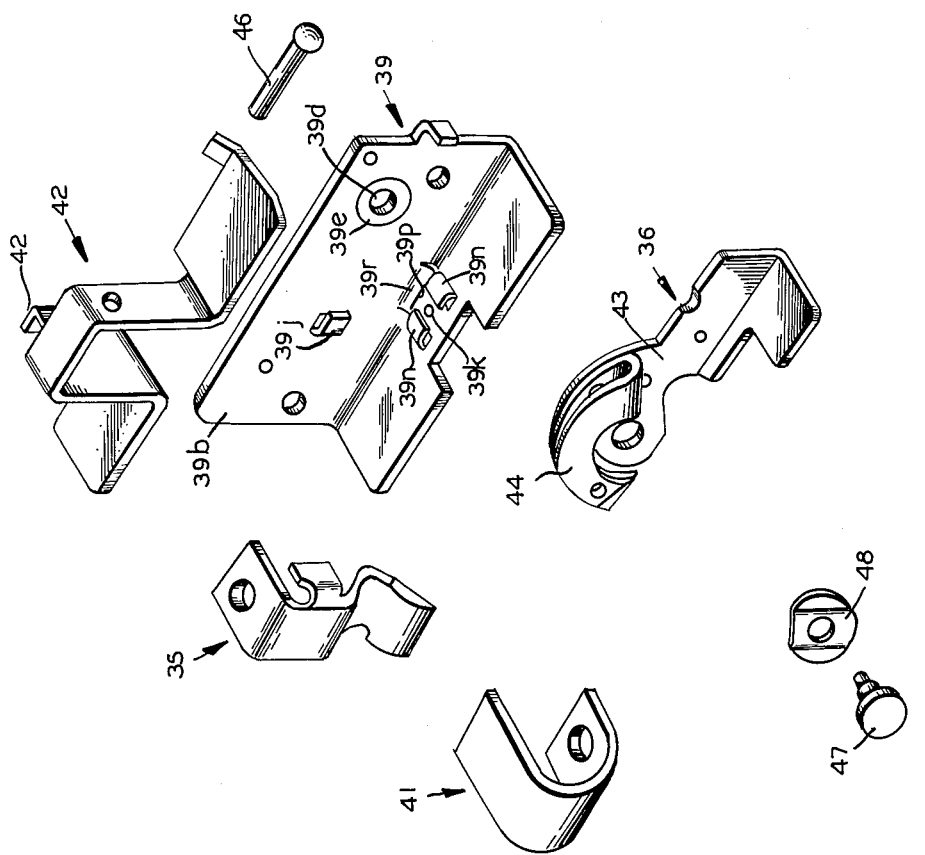
Fig. 21 is an exploded view showing the various portions of the latch.

Fig. 21 shows in exploded relation the latch frame 10, locking lever 36, stirrup 42, dog-retracting C-spring 41, and locking dog 35. The dog 35 is nested within the stirrup 42 and is mounted on a pivot in the form of a rivet 46 that passes through the two vertical legs of the stirrup. The locking lever 36 is mounted on a pivot in the form of a shouldered rivet 47 that is attached to frame leg 39b at hole 39d, a spring washer 48 being inserted under the head of the rivet. The C-spring 41 is telescoped beneath the fingers 39m, 39m, being snapped over the raised button 39k and brought against abutment 39p, as already explained.

Figure 22:
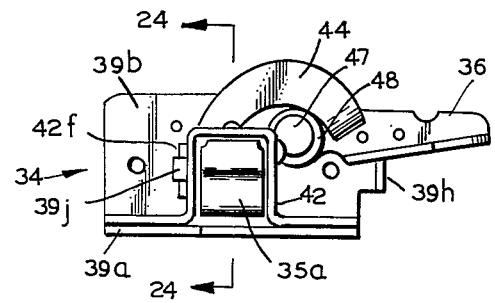
Fig. 22 is a front elevation of the assembled latch with the locking lever and locking dog in unlatched position.
Figure 23:
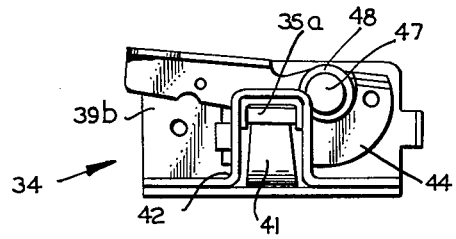
Fig. 23 is a view as in Fig. 22 but with the locking lever and locking dog in latched position.
Figure 24:
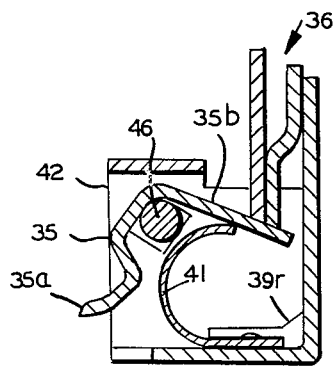
Fig. 24 is a section on an enlarged scale, taken as indicated by the line 24—24 in Fig. 22.

The assembled latch 34 is shown in Figs. 22–24. In Fig. 22 the locking lever 36 is in unlocked position and the nose 35a of the locking dog droops downwardly as shown in Fig. 24, the dog being retracted by C-spring 41. The bevelled nose of the locking lever 36 is in contact with the pressure-receiving arm 35b of the locking dog.

To move the dog to latched position and clamp the cover to the box, the locking lever 36 is swung counter-clockwise to the position shown in Fig. 23. As this movement begins, the nose of the locking lever (see Fig. 24) descends, swinging the locking dog 35 clockwise and stressing C-spring 41. When the nose 35a of the dog engages the top of dog-receiving opening 37 (Fig. 2) in the wall of the box, the locking lever 36 still has a considerable distance to go before reaching the fully locked position shown in Fig. 23. As the movement continues, the two branches of arcuate spring 44 (see also Fig. 15) yield relative to one another. This permits locking movement of the locking lever 36 to continue, with the application of increasingly strong locking force to the locking dog 35.

In the fully latched position, the nose 35a of the locking dog is inclined upwardly as shown in Fig. 2. The dog is made of hardened beryllium copper which is highly resilient. Thus, the nose of the dog is capable of resilient yielding as the locking pressure increases. The yieldability of the nose of the locking dog is additive to the yieldability of the arcuate spring 44, thereby providing much tolerance with strong cover-clamping pressure.

As is seen in Fig. 2, the cover 30 does not extend above the top edge of the box. With the locking lever 36 in fully locked position, the lever itself and all of the rest of the latch 34 are located within the channel 32 below the level of the top of the cover and the upper edge of the box. Thus, the latch is protected against damage during handling of the box, and the latch does not interfere in any way with stacking of the boxes with the covers in place. The locking levers 36 are finger operable, being swung counterclockwise to clamp the cover in place, and being swung clockwise to release the cover.

An important attribute of the present box is that while the cover is off the locking dogs are held retracted without danger of any of them being fortuitously moved into a position in which it would interfere with reapplication of the cover. When the locking lever 36 is swung into unlatched position it is arrested by finger 39h, as is shown in Fig. 22. In this position the depression 43m (Fig. 14) of the lever is in snap engagement with the button 39g (Fig. 3) on the frame of the latch. Thus, the locking lever is held against fortuitous return motion. And with the locking lever in unlatched position, the spring 41 holds the locking dog 35 retracted as shown in Fig. 24. The net result is that no special care is required, once the cover has been removed, to be sure that all locking dogs will remain in fully retracted position in which none of them will interfere with reapplication of the cover to the body of the box.

We claim:

1. A box having an annular wall providing a mouth; an annular abutment extending inwardly from the wall in spaced relation to the mouth; a cover nested within the annular wall of the box, the cover having a skirt the free edge of which is in contact with the abutment and the skirt having an offset which provides an annular channel extending around the inside of the box; a series of locking dogs distributed about the cover and carried thereby, the locking dogs being mounted on pivots that are parallel to the wall of the box, and the dogs and their mounts being located within said annular channel; a series of dog-receiving means distributed about the wall of the box to receive the noses of the locking dogs respectively; and finger-operable locking levers individual to the locking dogs and operable to swing the dogs into engagement with the dog-receiving means to thereby clamp the cover against the annular abutment, the locking levers being carried by the cover, being retractable to release the locking dogs, and being mounted on pivots that are perpendicular to the wall of the box, and the mounts of the locking levers being within said annular channel.

2. A box as in claim 1 in which the locking levers are wholly within the annular channel when the levers are in locked position.

3. A box as in claim 1 in which the noses of the locking dogs are yielding and the noses of the locking dogs are upwardly inclined when the dogs are in locked position.

4. A box as in claim 1 in which the locking levers are provided with yielding means which engage the locking dogs to swing the dogs into engagement with the dog-receiving means.

5. A box as in claim 4 in which the yielding means are arcuate springs lying generally parallel to the wall of the box.

6. A box as in claim 1 in which (a) the inwardly-extending annular abutment is faced with a gasket that is engaged by the free edge of the cover-skirt, (b) the locking dogs are yielding, (c) the locking levers are provided with yielding means which engage the locking dogs to swing the dogs into engagement with the dog-receiving means and (d) when the levers are in locked position the noses of the dogs are upwardly inclined and the levers are wholly within the annular channel.

7. A box as in claim 1 in which there is means operative upon full retraction of the locking levers to resist forward motion of the locking levers and in which there is also means to retract the locking dogs as they are released and hold them retracted while the locking levers are in fully retracted position.

8. A box as in claim 7 in which there is means to positively arrest the locking levers upon their reaching fully retracted position.

9. A box having an annular wall providing a mouth; a series of dog-receiving means distributed about the wall of the box to receive the noses of locking dogs respectively; an annular abutment extending inwardly from the wall of the box in spaced relation to the mouth of the box; a cover nested within the annular wall of the box, the cover having a skirt the free edge of which is in contact with the annular abutment, and the skirt having an offset which provides an annular channel extending around the inside of the box, the bottom and the inner wall of the channel being formed by portions of the skirt that are perpendicular to each other; and a series of finger-operable latches attached to the cover to latch the cover to the wall of the box and clamp the cover against the annular abutment, each latch comprising: an L-shaped frame having one leg against the inner wall of said annular channel and the other leg against the bottom of said annular channel; a stirrup extending upwardly from the frame-leg that is against the bottom of the channel; a locking dog pivotally mounted in the stirrup on an axis parallel to the wall of the box; and a locking lever operable to engage the locking dog and swing the nose of the dog into engagement with one of the dog-receiving means on the wall of the box, the locking lever being attached to the frame-leg that is against the inner wall of said channel and being pivotally mounted on an axis that is perpendicular to the wall of the box.

10. A box as in claim 9 in which the stirrup of each latch has at its bottom spaced-portions that are securely attached to the frame-leg of the latch that is against the bottom wall of the channel, and the stirrup has near its top a portion which is structurally tied to the frame-leg that is against the inner wall of the channel.

11. A box as in claim 9 in which a C-shaped spring is located within the stirrup and has one end attached to the frame-leg that is against the bottom of the channel, and the other end of the spring engages the locking dog to retract it when it is released by the locking lever.

12. A box as in claim 11 in which the attached end of the C-shaped spring is telescoped under ears struck up from the frame-leg that is against the bottom of the channel and the adjacent tip of the spring is against a portion struck inwardly from the frame at the juncture of the two legs of the frame.

13. A box as in claim 9 in which the locking lever is provided with a yielding arcuate spring that lies generally parallel to the wall of the box and which engages the locking dog to swing it into locked position.

14. A box as in claim 13 in which the arcuate spring is folded back upon itself, providing two branches which yield relative to one another when the spring engages the locking dog.

15. A box as in claim 14 in which the ends of both branches of the arcuate spring are attached to the body of the locking lever.

References Cited in the file of this patent
UNITED STATES PATENTS

| | | |
|---|---|---|
| 84,098 | Edson | Nov. 17, 1868 |
| 1,321,053 | Kastler | Nov. 4, 1919 |
| 1,531,487 | Lundberg | Mar. 31, 1925 |
| 2,101,465 | Beers | Dec. 7, 1937 |
| 2,122,105 | Mauser | June 28, 1938 |